(12) United States Patent
Juventin et al.

(10) Patent No.: US 9,818,988 B2
(45) Date of Patent: Nov. 14, 2017

(54) ISOLATING DEVICE FOR ELECTRICALLY ISOLATING A PLURALITY OF POWER-STORAGE ASSEMBLIES FROM ONE ANOTHER

(71) Applicant: BLUE SOLUTIONS, Ergue Gaberic (FR)

(72) Inventors: Anne-Claire Juventin, Quimper (FR); Laurent Le Gall, Ergue Gaberic (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 335 days.

(21) Appl. No.: 14/383,878

(22) PCT Filed: Mar. 11, 2013

(86) PCT No.: PCT/EP2013/054831
§ 371 (c)(1),
(2) Date: Sep. 8, 2014

(87) PCT Pub. No.: WO2013/132093
PCT Pub. Date: Sep. 12, 2013

(65) Prior Publication Data
US 2015/0024254 A1    Jan. 22, 2015

(30) Foreign Application Priority Data

Mar. 9, 2012   (FR) ..................................... 12 52158

(51) Int. Cl.
*H01M 2/02* (2006.01)
*H01G 4/38* (2006.01)
(Continued)

(52) U.S. Cl.
CPC .......... *H01M 2/0202* (2013.01); *H01B 17/56* (2013.01); *H01B 19/00* (2013.01);
(Continued)

(58) Field of Classification Search
None
See application file for complete search history.

(56) References Cited

U.S. PATENT DOCUMENTS

| | | | |
|---|---|---|---|
| 4,584,630 A | 4/1986 | Rubin | |
| 2009/0059470 A1* | 3/2009 | Morita | H01G 2/06 361/308.3 |
| 2010/0247994 A1* | 9/2010 | Park | H01M 2/105 429/96 |

FOREIGN PATENT DOCUMENTS

| | | |
|---|---|---|
| EP | 1 069 631 A1 | 1/2001 |
| JP | 01-253219 | 10/1989 |

OTHER PUBLICATIONS

Machine Translation of Yamashita (JP 01253219 A).*

* cited by examiner

*Primary Examiner* — Patrick Ryan
*Assistant Examiner* — Haixia Zhang
(74) *Attorney, Agent, or Firm* — Blakely Sokoloff Taylor & Zafman LLP

(57) ABSTRACT

One subject of the invention is an isolating device (10) for electrically isolating a plurality of power-storage assemblies (102) placed side-by-side in a power-storage module (100) from one another, the device comprising a sheet (11) made of an electrically insulating material lying in a main plane (P), the device also comprising at least one tongue (12A-12E; 14A-14E, 16A-16E, 18A-18D, 20A, 20D, 22A-22D) integral with the sheet (11) and capable of protruding from the main plane (P) of the sheet by extending essentially perpendicularly to said main plane of the sheet. Another subject of the invention is a module comprising at least one of these devices.

11 Claims, 5 Drawing Sheets

(51) Int. Cl.
    *H01G 9/26*     (2006.01)
    *H01G 11/10*     (2013.01)
    *H01G 11/78*     (2013.01)
    *H01G 2/02*     (2006.01)
    *H01M 6/44*     (2006.01)
    *H01M 2/10*     (2006.01)
    *H01B 17/56*     (2006.01)
    *H01B 19/00*     (2006.01)

(52) U.S. Cl.
    CPC ................ *H01G 2/02* (2013.01); *H01G 4/38* (2013.01); *H01G 9/26* (2013.01); *H01G 11/10* (2013.01); *H01G 11/78* (2013.01); *H01M 2/024* (2013.01); *H01M 2/105* (2013.01); *H01M 2/1077* (2013.01); *H01M 6/44* (2013.01); *Y02E 60/13* (2013.01); *Y10T 29/49227* (2015.01)

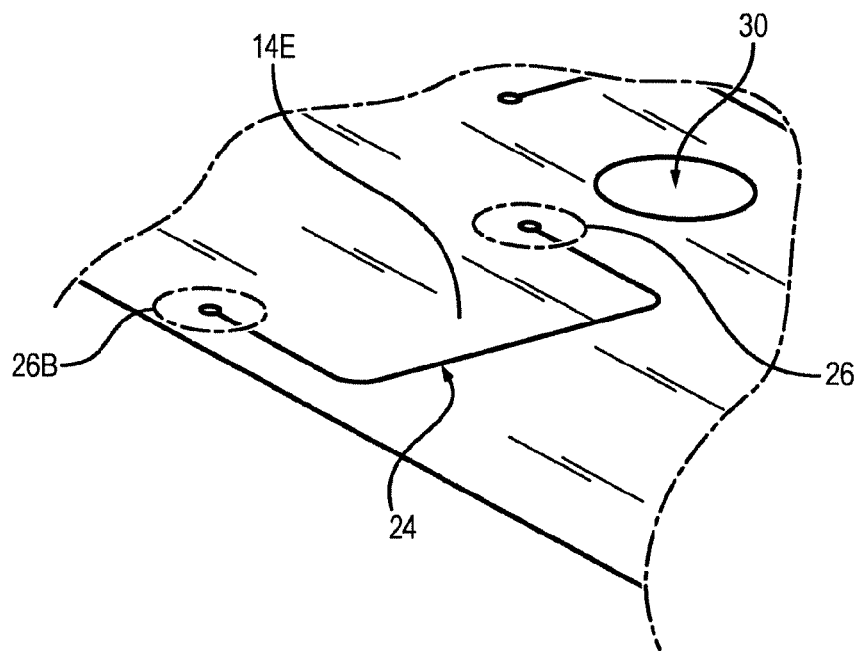
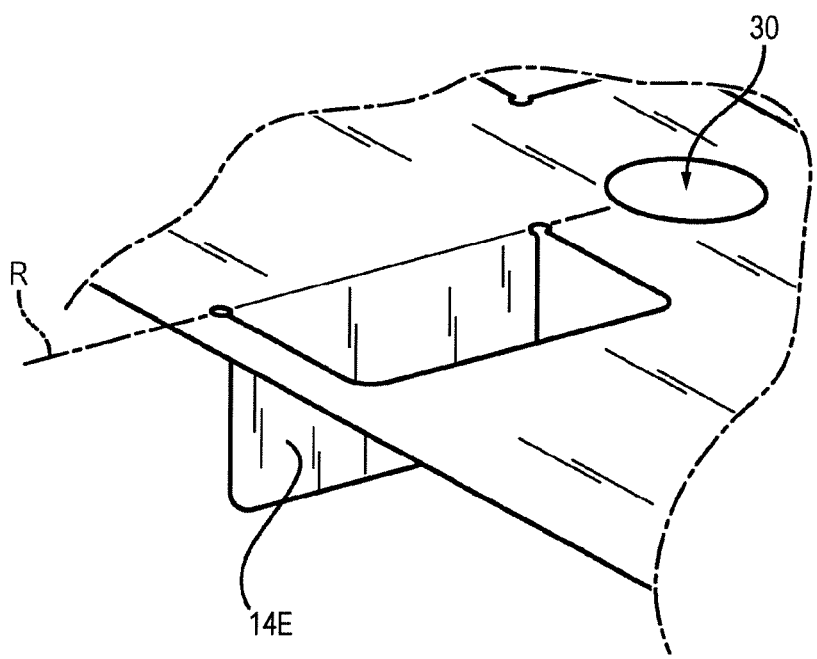

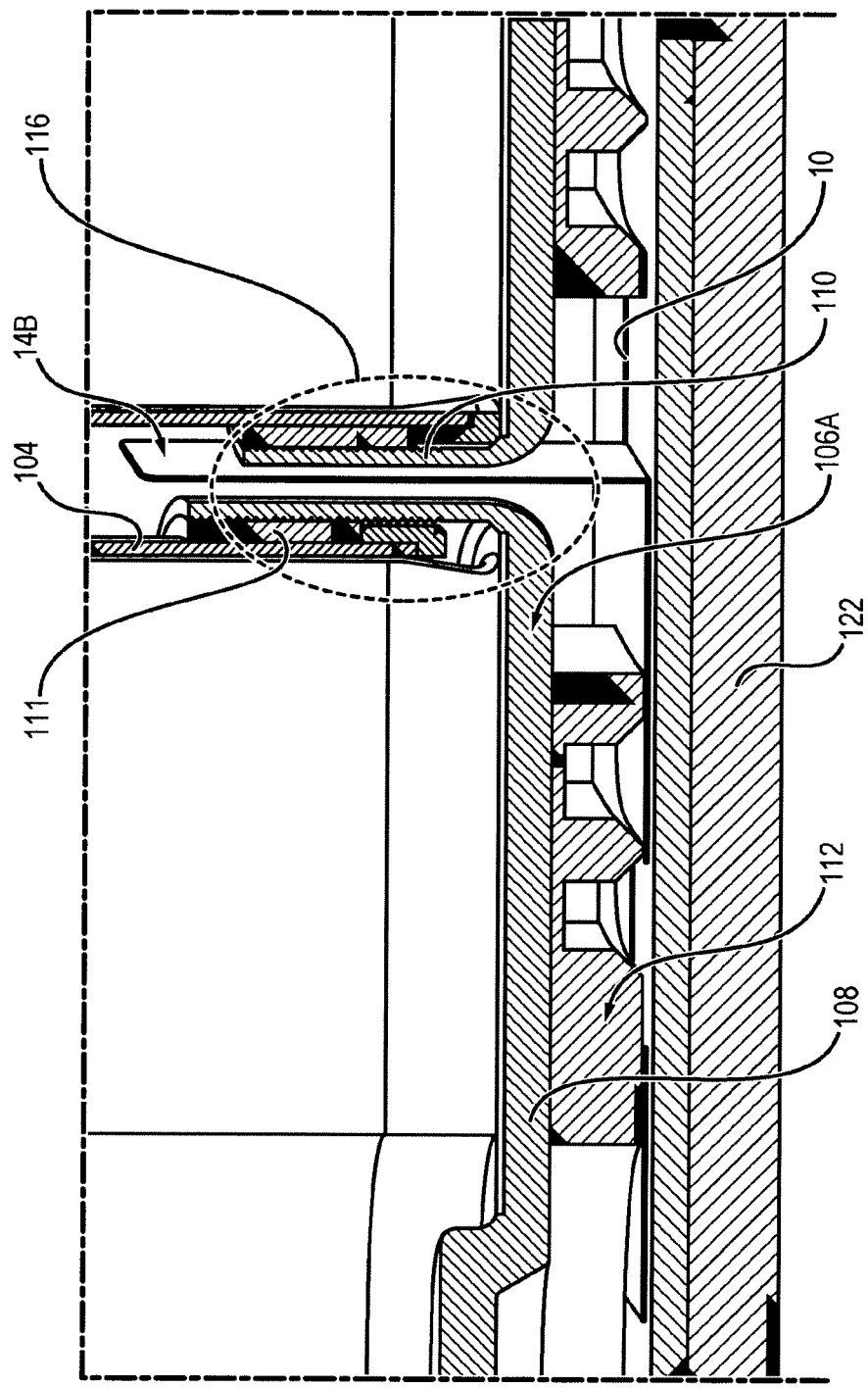

ISOLATING DEVICE FOR ELECTRICALLY ISOLATING A PLURALITY OF POWER-STORAGE ASSEMBLIES FROM ONE ANOTHER

The present application relates to the field of power-storage assemblies, particularly modules including a plurality of power-storage assemblies positioned side by side and electrically connected in series. More particularly, the application relates to an isolating device which can isolate storage assemblies from one another within such a module.

It is recalled that such power-storage assemblies generally include an enclosure consisting of a housing that is closed, at one of its ends at least, by a cover, and in which is placed a structure including at least one positive electrode and one negative electrode, each connected to a collector, and an electrolyte allowing the transfer of ions between the positive and negative electrodes. These assemblies can in particular constitute capacitors, batteries or supercapacitors.

Already known in the prior art is a power-storage module including a plurality of power-storage assemblies. In this type of module, the elements are generally electrically isolated from one another in two ways:
- either by maintaining them at a distance from one another using an assembly holding device, made of an electrically insulating material, which makes it possible to determine the position of each of the assemblies. Such a device can consist in particular of a structure placed on the bottom of the module and made of an elastomeric material, particularly of EPDM, and including recesses separated by studs provided for chocking the storage assemblies.
- or by protecting the assemblies by surrounding each assembly with a sheath made of electrically insulating plastic. This sheath can be heat-shrinking or held in place on the assembly using a gasket mounted around the assembly and the sheath.

These techniques, however, are not optimal.

The heat-shrink sheath technique in particular is not easily applicable because the shrinkage of the sheath is rather difficult to control and often requires the implementation of a finishing step to free the cover of the assembly which allows electrical connection of the assembly to an adjoining assembly. In addition, the step of heating the assembly allowing shrinkage of the sheath is likely to damage the electrolyte of the assembly. In the case of a sheath held by an O-ring, the sheath has a tendency to slip and isolation is therefore not optimal. In addition, in both cases, the result of using this technique is that the process of assembling the module is rather long, because a specific isolation step must be performed on each storage assembly.

The spacing technique as presented above allows much simpler assembly of the module but does not make it possible to obtain a minimum module size, as the assemblies are not in contact with one another. In addition, if the studs are dimensioned such that the volume of the module remains acceptable, only assemblies with dimensions very close to the theoretical dimensions may be accepted. This poses problems, particularly for centering the cover on the case. This technique is therefore likely to generate a high assembly reject rate and/or a non-negligible loss of useful volume inside the module. In addition, the holding plate can be relatively costly to manufacture.

A remedy is therefore sought for these disadvantages.

To this end, the invention has as its object an isolating device for electrically isolating from one another a plurality of power-storage assemblies arranged side by side in an power-storage module, the device including a sheet made of an electrically insulating material and extending along a main plane, the device also including at least one tongue integral with the sheet and able to protrude from the main plane of the sheet while extending essentially perpendicularly to said main plane of the sheet.

In particular, the invention has as its object an isolating device for electrically isolating from one another a plurality of power-storage assemblies positioned side by side in an power-storage module, the device including a sheet made of an electrically insulating material and extending along a main plane, the device also including at least one tongue integral with the sheet for electrically isolating two adjoining storage assemblies, particularly two terminals belonging respectively to two adjoining storage assemblies, said tongue being intended to protrude from the main plane so as to be positioned between two adjoining storage assemblies. In some embodiments, the sheet made of insulating material can make it possible to electrically isolate the storage assemblies of the module.

It shall be noted that, when it is stated that the isolating device is designed to electrically isolate from one another a plurality of power-storage assemblies, that means that it is able to isolate at least one terminal of the storage assembly from one terminal of an adjoining storage assembly, the two terminals not being at the same potential, this even if the opposite terminals of said storage assemblies are at the same potential and therefore electrically connected. In fact, each storage assembly includes two terminals, each of the terminals having a different potential, the two terminals of each of the assemblies being electrically isolated from one another.

Thus the main plane of the sheet is laid on the storage assemblies, at one end at least of the same, and the tongue protruding from the main plane extends between the two assemblies at the contact area between the two elements, to electrically isolate these assemblies from one another.

The isolation sheet can be very thin and need only extend between the two assemblies at their contact area. Indeed, the potential difference between two adjoining assemblies is very low, on the order of a few volts, and the interposition of a sheet made of insulating material is sufficient to avoid a short-circuit between the elements in the contact areas between them. In addition, the distance, however minimal, between the assemblies is sufficient to isolate them in their non-contacting areas.

The isolating device according to the invention therefore allows effective isolation of the elements from one another. In addition, it is very easy to install during assembly of the module. Indeed, a single part can make it possible to provide isolation of numerous elements from one another, which limits the number of operations needed to attain this goal. In addition, the creation of the device remains relatively simple, as it is sufficient to lay the sheet on the elements and to adjust the position of the tongues relative to the assemblies, which does not require a great deal of assembly time.

The invention thus makes it possible to considerably decrease the costs devoted to this function due to the simplification of assembly and the limited number of parts to be used to accomplish this function.

In addition, as the sheet can be sized rather thin, the size of the module can be optimized as the elements are abutting one another (within one thickness of the tongue). Due to its constitution as a sheet, which gives a certain flexibility, the device also makes it possible to better adapt to geometric flaws in the assemblies, particularly as regards centering the cover on the case. The demands imposed on the finished assemblies and the reject rate of the same can then be reduced. This can also lead to a simplification of the process of manufacture of the assembly itself due to this reduction in the severity of the demands.

It was also perceived that the device had a good resistance to aging and resisted mechanical vibrations, compression and module temperature increases well and thus fulfils all the conditions of the specifications of a module.

The particular embodiments of the invention will now be described with the help of the drawings listed below, wherein:

FIGS. 2A and 2B are perspective views of a detail of the device, respectively in the fabrication and installation configurations thereof;

FIG. 5B is a view of a detail of FIG. 5A.

Figure 1:
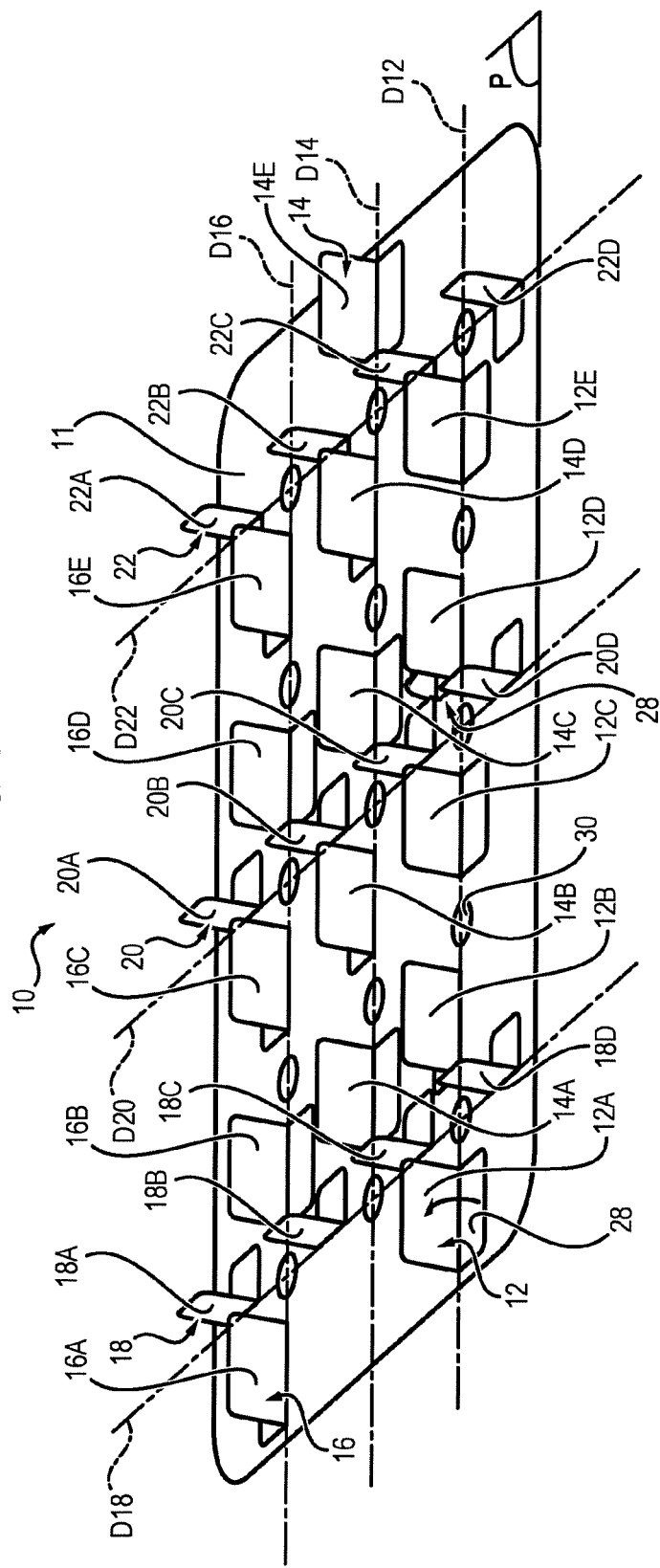
FIG. 1 is a perspective view of an isolating device according to one embodiment of the invention, prior to installation into an energy storage module.

As already indicated above and shown in the figures, the invention relates to an isolating device (10) for electrically isolating from one another a plurality of power-storage assemblies (102) positioned side by side inside a power-storage module (100), the device including a sheet (11) made of an electrically insulating material and extending along a main plane (P), the device also including at least one tongue (12A-12E; 14A-14E, 16A-16E, 18A-18D, 20A-20D, 22A-22D) integral with the sheet (11) and able to protrude from the main plane (P) of the sheet by extending essentially perpendicularly to said main plane of the sheet.

Said sheet (11) is preferably made of a flexible material.

In one embodiment of the invention, the, or at least one of the tongues (12A-12E; 14A-14E, 16A-16E, 18A-18D, 20A, 20D, 22A-22D) is movable in rotation relative to the rest of the sheet (11) about a fold axis (R), such that it has a manufacturing configuration wherein it lies in the main plane (P) and a folded configuration wherein it is placed in a plane substantially perpendicular to the main plane. This embodiment makes it possible to further simplify the manufacture of the device because it is then unnecessary to have a special moulding tool available to manufacture the same. Indeed, the device (10) can be moulded flat and then cut out, which makes it possible to simplify its manufacturing process and also to save some material. By "movable in rotation" is meant that each tongue can be displaced at will between the manufacturing configuration and the folded configuration.

In this case in particular, the sheet (11) is cut out along a contour portion (24) to form the tongue, a segment connecting the two ends (26) of the contour portion coinciding with the fold axis of the tongue. In this case, too, the sheet (11) can have at least one end (26) hole, at one at least, particularly at each segment junction coinciding with the fold axis (R) of a tongue and of the corresponding cut-out contour portion (24). Such a hole makes it possible to end the contour neatly to avoid an incipient crack extending the cutout line when the device is placed inside the module and the tongue is subject to forces.

In one embodiment of the invention, the sheet (11) includes at least two tongues (12A-12E; 14A-14E, 16A-16E, 18A-18D, 20A, 20D, 22A-22D) essentially perpendicular to one another when they protrude from the main plane of the sheet by extending perpendicular to the main plane.

In one embodiment of the invention, the device includes at least one row (12, 14, 16, 18, 20, 22) of tongues, the respective straight intersection lines whereof with the main plane, corresponding in particular with the respective fold axes (R) of said tongues, coincide. The fold axis of the tongues for the straight intersection line of the row (D12, D14, D16, D18, D20, D22) with the main plane (P).

More particularly, the device includes a first row (12, 14, 16) of tongues and a second row of tongues (18, 20, 22) arranged in relation to the first row such that the straight intersection line of the first row with the main plane is perpendicular to the straight intersection line of the second row with the main plane of the device. The device can include in particular:

a plurality of first rows (12, 14, 16), the straight intersection line of one of the first rows being essentially parallel to the straight intersection line of another first row, and/or a plurality of second rows (18, 20, 22), the straight intersection line of one of the second rows being essentially parallel to the straight intersection line of another second row.

This architecture makes it possible to isolate the supercapacitors in their contact areas in many module configurations.

In one embodiment of the invention, at least two tongues (12A-12E; 14A-14E, 16A-16E, 18A-18D, 20A, 20D, 22A-22D) protruding from the same side (i.e. on the same face) of the sheet in their folded configuration and having essentially parallel, or coincident, fold axes, the tongues being configured in such a way that the directions of rotation to change from the manufacturing condition to the folded condition are opposite.

The device can in particular include at least one row (12, 14, 16, 20) of tongues with coincident fold axes and wherein, for at least one, particularly each row, the direction of rotation of a given tongue (12A-12E; 14A-14E, 16A-16E, 20A-20D) to change from a manufacturing configuration to a folded configuration is opposite to that of the tongue(s) adjoining it in its row.

The device can also include two tongues from two parallel rows that are overlapped (i.e. there exists at least one perpendicular in the main plane to the straight intersection line (D12, D14, D16, D18, D20, D22) of at least one of the rows of these tongues), or aligned, the direction of rotation of a given tongue (12A-12E; 14A-14E, 16A-16E, 20A-20D) to change from a manufacturing configuration to a folded configuration being opposite to that of a least one tongue with which it is overlapped or aligned.

This makes it possible to stabilize the position of the device in the module. Indeed, the tongues can have a tendency to return to their manufacturing configuration and to thus cause a displacement of the sheet (sliding effect). However, when the directions of rotation of the two tongues are opposite, these local forces generated on the sheet at each tongue have no cumulative effect because they compensate each other.

In one embodiment of the invention, the sheet (11) comprises at least one hole (30; 32) located remotely from all the tongues (12A-12E; 14A-14E, 16A-16E, 18A-18D, 20A, 20D, 22A-22D). This hole (30) can have the function of allowing passage for a module reinforcement. It can then for example be located at an intersection of two rows of tongues. This hole (32) can also have the function of facilitating the escape of heat from the various power-storage assemblies toward the outside of the module. It has been observed that, even with such holes, the mechanical strength of the isolating device is sufficient for the use for which it is designed.

In one embodiment of the invention, the sheet (11) is made of plastic, particularly of polypropylene, such as PPHF (polypropylene hollow fibre). The electrical properties of this material are sufficient to isolate two elements from one another and its other properties (mechanical strength, temperature resistance, etc.) allow the device to perfectly fulfil the specifications to be placed in a power-storage module.

In one embodiment of the invention, the sheet (11) and the tongues (12A-12E; 14A-14E, 16A-16E, 18A-18E, 20A, 20D, 22A-22D) have a thickness of less than 1 mm, particularly less than 500 microns, preferably comprised between 200 and 300 microns. Such a thickness is sufficient and allows the tongues to easily slip between the assemblies of the module, even when these are held in contact with one another, due to the mounting clearance inside the module (the assemblies are each attached only to two adjoining assemblies).

The invention also has as its object a power-storage module (100) including a plurality of power-storage assemblies (102), each having two end faces (108A, 108B) and at least one lateral face (104), electrically connected in series and positioned side by side such that the respective first end faces of the assemblies are substantially located in one first end plane (P1), the second respective end faces being substantially located in one and the same second end plane (P2) essentially parallel to the first plane, the module also including at least one isolating device (10) according to the invention, arranged so that:

the main plane (P) of the sheet is essentially parallel to the first and second planes (P1; P2) and the sheet (11) is superposed with the end faces (108A, 108B) of at least two assemblies of the module, the tongue(s) (12A-12E; 14A-14E, 16A-16E, 18A-18E, 20A, 20D, 22A-22D) lying in a plane substantially perpendicular to the main plane so that each tongue is interposed between two power-storage assemblies (102) in an abutment area (116) between the two elements.

In one embodiment of the invention, the module (100) includes at least one first isolating device (10A) placed under the lower end faces of at least two storage assemblies and at least one second isolating device (10B) placed on the upper end faces of at least two assemblies.

In one embodiment of the invention, the sheet (11) of at least one isolating device (10A, 10B) is dimensioned to cover all the end faces of the adjoining assemblies.

In one embodiment of the invention, in a given end plane, at least one connecting strip (112) electrically connects the end faces (108) of two adjoining elements, the isolating device(s) (10A, 10B) superposed with said end plane being configured such that tongues (12A-12E; 14A-14E, 16A-16E, 18A-18D, 20A, 20D, 22A-22D) are interposed between all the adjoining assemblies with the exception of those connected by a connecting strip.

These different characteristics make it possible to isolate the totality of the assemblies thanks to this device, also providing for simple assembly and effective isolation.

In one particular embodiment, each storage assembly (102) includes an enclosure including a case (104) closed at one at least of its ends by a cover (106A, 106B) having a wall (108A, 108B) forming an end face and a collar (110) surrounding the lateral face(s) of the case, the tongue being dimensioned so as to cover the assembly over at least the entire height of the collar (110), particularly over the entire height of the collar and of the strip, in the abutment area. As the collar increases the radial dimension of the assembly at its end, it is in fact unnecessary to dimension the tongue so that it covers the entire height of the assembly.

In one particular embodiment, the dimension of each tongue (12A-12E; 14A-14E, 16A-16E, 18A-18D, 20A, 20D, 22A-22D), in the direction corresponding to that of its straight intersection line (R) with the sheet (11), is greater than the dimension of the abutting area between two assemblies in that direction. The dimension of the tongue is preferably greater than 1 cm, possible greater than 3 cm. This makes it possible to manage the design clearance of the assemblies. The dimension of the tongue is chosen large enough to make it possible to allow assemblies to be included in the module even if they are imperfect relative to the dimensions set theoretically, so as to cause a reduction in the reject rate of these assemblies. The dimension according to the aforementioned direction of the tongue is in particular dependent on the number of assemblies in the row and directly dependent on the sum of the clearances allowed for the assemblies of one row, and in particular greater than that value.

In one embodiment of the invention, the module includes a protective case surrounding the totality of the power-storage assemblies, said case comprising an upper wall (120) and a lower wall (122) each superposed with an end plane of the assemblies, the sheet (11) of the or of each isolation device being arranged between an end plane of the assemblies and the corresponding wall (120, 122) of the enclosure.

In one embodiment of the invention, the module also includes at least one reinforcement connecting the upper (120) and lower (122) walls of the module case, at least one isolation device (10A, 10B) including at least one hole (30) allowing passage of the reinforcement, said hole being preferably placed at the intersection of a first and of a row of tongues.

In one embodiment of the invention, the sheet (11) of the device includes at least one portion superposed on at least one connecting strip (112), at least one exhaust port (32) being provided in this portion to allow better heat escape from the assemblies (102) to the case.

In this case, an electric isolation, and possibly thermal conduction, element can be interposed between the sheet (11) and the case, so as to isolate the assemblies from the outside.

The invention also has as its object a manufacturing method for an isolating device (10) according to the invention, including the following steps:

a sheet (11) is made from electrically insulating plastic, particularly by extrusion, the contour (24) of at least one tongue (12A-12E; 14A-14E, 16A-16E, 18A-18D, 20A, 20D, 22A-22D) is cut out of this sheet, particularly by mechanical cutting, the tongue (12A-12E; 14A-14E, 16A-16E, 18A-18D, 20A, 20D, 22A-22D) is arranged in a folded configuration wherein the tongue protrudes from the main plane of the sheet, for example wherein the tongue is essentially perpendicular to the main plane (P) of the sheet (11).

Different embodiments of the invention will now be described in detail, based on the figures.

Shown in FIG. 1 is an isolating device 10. As can be seen on this figure, the device consists of a sheet 11 made of an electrically insulating plastic such as polypropylene, particularly PPHF (polypropylene hollow fibers) and extending essentially in a main plane (P). This sheet has a thickness of less than 1 mm, particularly less than 500 microns, and particularly of 250 microns, and is therefore flexible.

The device 10 also includes a plurality of tongues 12A-12E; 14A-14E, 16A-16E, 18A-18D, 20A-20D, 22A-22D, all protruding from the same side of the sheet in a plane essentially perpendicular to the main plane (P). The tongues are formed integral with the sheet 11.

These tongues have an essentially rectangular shape. As can be seen in FIGS. 2A and 2B, each of these tongues is cut out of the sheet 11 along a contour 24 corresponding to three sides of the rectangle forming the tongue and are then folded relative to a fold axis (R) corresponding to the fourth side of the rectangle forming the tongue. The fold axis corresponds to the segment connecting the two ends of the contour. The tongues are therefore movable in rotation and capable of changing from a manufacturing condition, shown in FIG. 2A, wherein they lie in the plane (P) of the sheet, to a folded configuration shown in FIG. 2A wherein it extends in a plane essentially perpendicular to the main plane (P). This allows a further reduction in the manufacturing costs of the device, because it can be manufactured in a single plane (by extrusion for example) and does not therefore require a special moulding operation for each part.

Also noticeable, in FIG. 2B, is that at both ends of the contour 26 forming the tongue, the sheet 11 has two rounded holes 26A, 26B which make it possible to avoid crack inceptions extending the cutout line in the sheet and which could be a consequence of folding the tongue.

As can be seen in FIG. 1, the device 10 includes a plurality of rows 12, 14, 16, 18, 20, 22. Each row includes a plurality of tongues having coincident fold axes (R). The common fold axis of the tongues corresponds to the straight intersection line (D12), (D14), (D16), (D18), (D20), (D22) of the row with the plane (P). In particular, the device has three rows 12; 14, 16 the straight intersection lines whereof (D12), (D14), (D16) are essentially parallel, said straight lines also being parallel to two sides of the sheet and three rows 18, 20, 22 having essentially parallel straight intersection lines (D18), (D20), (D22) also parallel to two other sides of the sheet. The straight intersection lines of rows 12-16 and those of rows 18-22 are therefore also essentially perpendicular. Moreover, the tongues are placed in the different rows such that no tongue is placed at the intersection of the rows.

It is also noted that, in each row 12, 14, 16 and 20, the tongues in the folded configuration lie within one and the same plane, essentially perpendicular to the main plane (P), but the holes left in the sheet and corresponding to the position of the tongue in the manufacturing configuration extend to either side of said plane. This means that the rotation a first portion of the tongues of each row 12, 14, 16, 20 must be performed in a given direction of rotation to change the tongue from its manufacturing configuration to its folded configuration while, for the other portion of the tongues in the row, the direction of rotation to change from its manufacturing configuration to its folded configuration is opposite to the given direction of rotation. For example, regarding row 12, tongues 12A, 12C, 12D must undergo rotation in a first direction while tongues 12B and 12D must undergo rotation in the opposite direction (but still about the same axis) to change from their manufacturing configuration to their folded configuration. In these rows, the tongues undergo rotation in a first direction and the others alternate so that, for each tongue undergoing rotation in a given direction to change from a manufacturing configuration to a folded configuration, the adjoining tongues of the same row undergo rotation in the opposite direction to accomplish this.

It is also noted that the tongues of the different rows are arranged so as to overlap one another, that is there exists at least one perpendicular in the main plane (P) to the straight intersection line of at least one of the rows passing through several tongues belonging to different rows. Tongues 12B; 14A and 16B overlap for example, likewise tongues 18D, 20D and 22D.

In the example of FIG. 1, the tongues in the different rows are arranged equidistant from one another and the tongues in the different rows are all aligned (12B, 14A, 16B for example), which means that the ends of their fold axes are located on two essentially parallel straight lines essentially perpendicular to the straight intersection line (D12), (D14), (D16) of one or the other row. The row 14 is offset relative to rows 12 and 16 and thus includes a tongue that is not aligned with any of the others.

Yet, as can be observed, the device is also configured so that, among the aligned tongues of different rows, there exists one or more tongues which change from the manufacturing configuration to the folded configuration due to rotation in a given direction (12B), while one or more other tongues (14A, 16B) change from the manufacturing condition to the folded condition due to rotation in the direction opposite to the given direction. This is the case for all the aligned tongues (12A/16A; 12C/14B, 16C; 18D, 20D/22D for example).

These design choices are particularly advantageous because they make it possible to maintain the isolating device in position when it is subjected to forces. In fact, the forces exerted by the tongues to return to their initial positions are then opposite, which makes it possible to guarantee that the device is held in place in the modules and to avoid slippage phenomena.

It can also be seen that the tongues in rows 12, 14, 16 along the longer sides of the sheet 12 are wider than the tongues in rows 18, 20, 22 along the shorter sides of the sheet 12.

Also to be seen in FIG. 1 are round holes 30 located remotely from the tongues, of which some are located at the intersections of rows that are essentially mutually perpendicular. These holes are shaped to allow passage of a reinforcement of the module.

Figure 3:
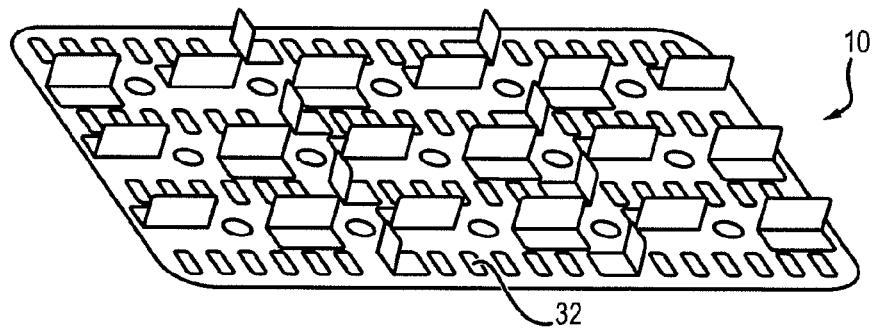
FIG. 3 is a variant embodiment of the isolating device of FIG. 1.

It will be noted that the device according to the invention can be different from what has been described. As shown in FIG. 3, it can include additional functions, particularly openings 32 to allow better exhausting of the heat of the assemblies toward the outside of the module.

The arrangement of the tongues and the number of tongues can also be totally different from what has been described: for example, the tongues may not be arranged in rows, and/or not aligned, and/or not have different directions of rotation. A single tongue extending essentially over the entire length of the sheet 11 can for example be created to isolate several assemblies from one another and to replace all the tongues of a given row.

The device 10 according to the invention is very simply manufactured in the following way. The sheet 11 is manufactured by extrusion (the material is extruded, then leaves through a die and is rolled by rollers so as to form a film). This film is manufactured continuously and is of very great length. Its manufacturing cost is consequently rather limited. Then, the film is cut out, particularly using a mechanical cutter, to give it the dimensions of the module and to form within it the tongues and the possible holes and openings. These tongues could also be formed by punching. All the tongues in the sheet are then folded. The cutting-out step and possibly the folding step can be carried out automatically, using a specially programmed machine tool for the purpose, which also allows time saving during manufacture.

The device can also be moulded so that the tongues protrude from the main plane at the time of manufacture. The thickness and the material of the device are also not limited to what has been described here.

The interaction of the device 10 with a module of power-storage modules 100 will now be described.

Figure 4:
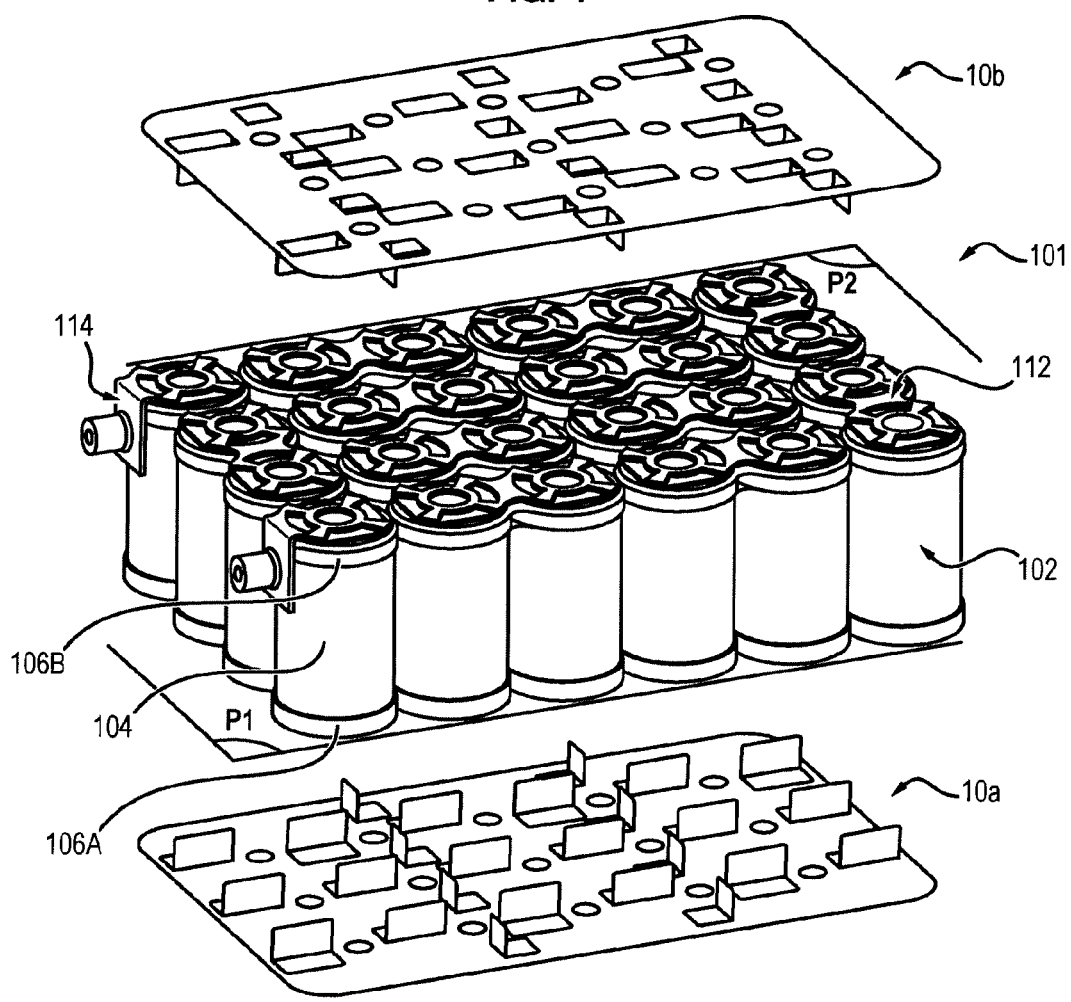
FIG. 4 shows an exploded view of a module core of power-storage assemblies according to one embodiment of the invention.

Such a module 100 includes a plurality of assemblies 102 (24 in number here) positioned side by side to form a module core 101 shown in FIG. 4 and including four rows of six assemblies 102.

In the example described here, the assemblies 102 are supercapacitors and each include an enclosure including a tube 104 closed at each of its ends by a cover 106A, 106B and enclosing the part of the product enabling power storage, which will not be detailed here. The enclosure is of essentially cylindrical form and each cover 106A, 106B is shaped to include a wall closing the tube and forming an end face 108A, 108B of the assembly and a collar 110 surrounding the tube 104 over a height less than the height of the tube, particularly at one-tenth the height of the tube.

The covers of each of the assemblies are made of metal and are electrically conductive. Each of the covers 106A, 106B is connected in particular to a terminal (positive or negative) of the assembly. An insulating seal 111 interposed between the cover 106A, 106B and the tube 104 makes it possible to electrically isolate the terminals from one another. Each of the terminals of the storage assembly has a distinct potential.

The assemblies are identical (same dimensions, etc.) and, when they are set side-by-side to form the module core 101, the end faces 108A, 108B respectively, of the assemblies 102 extend in the same end plane, (P1) and (P2) respectively.

The assemblies are connected two by two through connection strips 112. The assemblies are generally electrically connected in series by a first strip 112, at one of its end faces 108A, to an adjoining assembly and by a second strip, at another of its end faces 108B, to another assembly 102. The strips connect two terminals of two adjoining assemblies, the two electrically connected terminals then being at the same potential. It will be noted that the other two terminals of the two assemblies considered, also adjoining, have for their part differing potentials.

These assemblies are connected in such a way that the cover 106A, 106B of each assembly is in contact at an abutment area with the covers of all the adjoining assemblies, even if it is not connected by strips 112 to the same. Two end assemblies are not connected at the end plane P2 to another assembly, but are connected to input/output terminals 114 which extend outside the module and form the terminals thereof.

The totality of the connected assemblies forms the module core 101. This core is placed in a case 120 including a lower wall 122, an upper wall 124 and at least one sidewall 126, particularly four in the example. The devices 10A, 10B are placed such that the main plane (P) of their respective sheet 11 is interposed between the upper (P2) and lower (P2) end plane, respectively, of the module core 101 and the corresponding face 122, 124 of the case 120. Other elements are interposed between the module core and the case, such as an electronic management card, mechanical reinforcements, a thermal mat for removing heat, linings for the case walls, etc. These elements, however, are not really a part of the invention we will therefore not detail them here.

How the isolation device 10 interacts with the module will now be described.

As can be seen in FIG. 4, the device 10 is interposed between the end plane (P1), (P2) of the module core 101 and a wall 122, 124 of the case 120. The main plane (P) of the device 10A, 10B is essentially parallel to the plane (P1), (P2) of the end faces 108A, 108B of the module core 101. The tongues of each device are oriented toward the assemblies 102, so as to extend between them. The tongues of the device 10A extend upward while the tongues of the device 10B extend downward. The sheet 11 is formed so as to cover the totality of the assemblies and therefore has approximately the same dimensions as the corresponding wall of the case.

When the sheet 11 is laid on the strips 112 covering the end faces 108, the tongues insert themselves between the contact areas 116 of the assemblies: considering their reduced thickness, the clearance that exists at the assembly mountings is sufficient that these can be inserted between two assemblies.

Figure 5A:
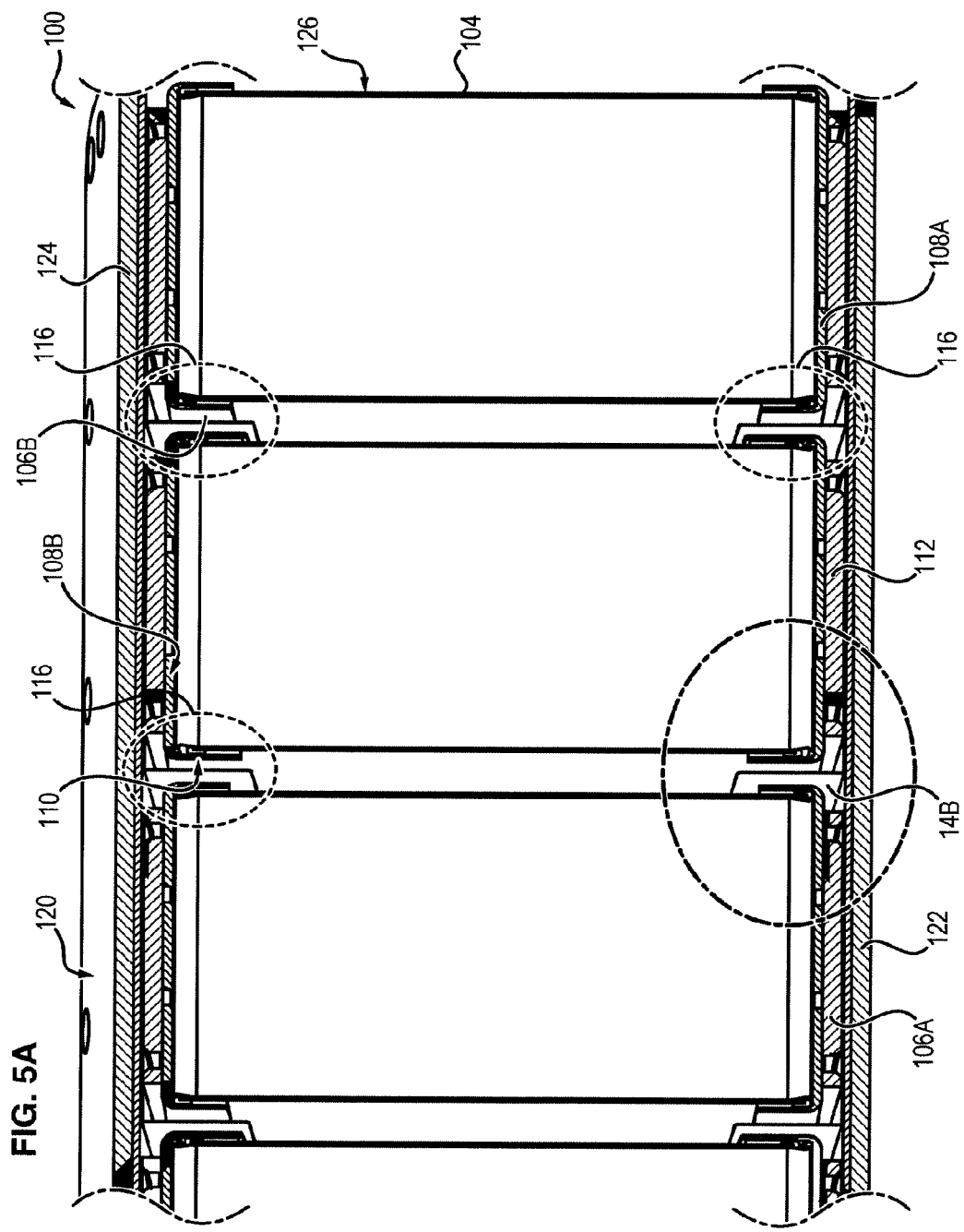
FIG. 5A is a section view of the complete module including the module core of FIG. 4.

As can be seen in FIG. 5, the height of the tongues in their folded configuration is greater than the height of the collar 110 of the cover 106A, 106B. In fact, due to the presence of the collar 110, at the rest of the tube 104 the distance between two adjoining assemblies is sufficient to insulate them from one another.

The tongues are positioned on the sheets 11 so that at each end of the module core, for each assembly, a tongue is inserted between each assembly and all the assemblies adjoining it, excepting that to which the assembly is connected by a strip 112 at the end face 108A, 108B on which is positioned the device 10A, 10B. It is noted, moreover, that the devices 10 located at the upper and lower ends of the module core are not the same, the inter-element connections not being the same. The device 10B corresponds to the device described in FIG. 1. In other words, a given terminal of a power-storage assembly is isolated by the sheet 11 from all the terminals of the adjoining assemblies, except the terminal to which it is connected, to with from three terminals by three adjoining tongues. The respective terminals of one and the same assembly are therefore isolated by means of the sheets from the terminals of three of the adjoining assemblies. However, for a given assembly, abutting four adjoining assemblies, one of the terminals is isolated by means of one of the sheets from the terminals of three of the four adjoining assemblies, while the other terminal is isolated by means of the other sheet from another three of the four adjoining assemblies.

It has been stated above that the tongues were only useful in the areas where the assemblies were likely to be in abutment. As already noted, however, these assemblies are defined by cylindrical enclosures. Contact between them is therefore line contact. However, due to the relatively large clearances which are allowed at the enclosures and particularly as regards concentricity of the covers, it is envisioned that the contact between two assemblies can occur within a given area in the vicinity of the assumed contact location. This area corresponds to the sum of the tolerances in the clearances on the enclosures of the assemblies contained in that row.

The dimension of the tongues in the direction of its axis (R) makes it possible to manage this clearance because it corresponds to or is greater than the dimension of this area, so that it can isolate the assemblies no matter what the contact location between two assemblies 102. Thus, this explains the difference in dimension between the tongues of rows 18, 20, 22 (which must cover an area corresponding to the clearance of four assemblies) and those of rows 12, 14, (which must cover an area corresponding to the clearance of six assemblies).

The clearance between assemblies in the direction perpendicular to the dimension of the axis (R) of the tongue is managed using the flexibility of the tongue, which can be folded to an angle other than 90° as needed or cover a portion of the end face of an element when its fold axis is not exactly facing the interface between two elements.

Thus, the isolation device 10 makes it possible to guarantee the mutual isolation of the elements and is easily installed on the module core 101, because it is sufficient to lay it on one face of the module and to adjust the position of each of the tongues with respect to the position of the elements. The module core is then turned over and the same thing is done regarding the other end face of the module.

It shall be noted that the module is not necessarily similar to that which has been described. The assemblies can be of different shapes than what has been described. Likewise, the different walls of the module case can be arranged differently from what has been described (the assembly can for example have only one cover) end the connections can also be accomplished by strips arranged differently from what has been described, or even by other means.

In addition, there could be an isolation device according to the invention at one end of the module and another isolation means for the other end. Likewise, the isolation device could be arranged to cover in one piece both the upper and the lower end planes of the module core. It could also be envisioned that there would be several isolation devices per face of the module core. This could for example be useful in the case where modules of different sizes are present and it is desired to use one standard isolation device for all these modules.

The invention claimed is:

1. An isolation device for electrically isolating from one another a plurality of power-storage assemblies arranged side by side in a power-storage module, the device including a sheet made of an electrically insulating flexible material and lying in a main plane, the device also including at least one tongue integral with the sheet for electrically isolating two adjoining storage assemblies, said tongue being made of an insulating material and being intended to protrude from the main plane so as to be positioned between two adjoining storage assemblies, wherein at least one of the tongues is movable in rotation relative to the rest of the sheet about a fold axis such that the sheet has a manufacturing configuration wherein the sheet lies in the main plane and a folded configuration wherein the sheet is placed in a plane perpendicular to the main plane wherein the sheet and the tongues have a thickness of less than 1 mm and wherein the sheet is cut out along a portion of a contour to form the tongue, a segment connecting the two ends of the contour portion coinciding with the fold axis of the tongue.

2. The device according to claim 1, wherein the sheet has at least one end hole, at least one junction of the segment coinciding with the fold axis of a tongue and the corresponding cut-out contour portion.

3. The isolation device according to claim 1, wherein the sheet includes at least two tongues which are mutually perpendicular when protruding from the main plane of the sheet by extending perpendicularly to the main plane.

4. The device according to claim 1, including at least one row of tongues the respective straight intersecting lines whereof with the main plane, corresponding to the respective fold axes of these tongues, coincide, and form the intersecting straight line of the row with the main plane.

5. The device according to claim 4, including at least a first row of tongues and at least a second row of tongues arranged relative to the first row in such a way that the intersecting straight line of the first row with the main plane is perpendicular to the intersecting straight line of the second row with the main plane.

6. The isolation device according to claim 1, including at least two tongues protruding from the same side of the sheet in their folded configuration and having parallel or coincident fold axes, the tongues being configured in such a way that the directions of rotation for changing from the manufacturing configuration to the folded configuration are opposite.

7. The device according to claim 1, wherein the sheet includes at least one hole located remotely from all the tongues.

8. The device according to claim 1, wherein the sheet is made of plastic.

9. The device according to claim 8, wherein the sheet is made of polypropylene or PPHF (polypropylene hollow fiber).

10. The device according to claim 1, wherein the sheet and the tongues have a thickness of less than 500 microns.

11. The device according to claim 10, wherein the sheet and the tongues have a thickness between 200 and 300 microns.

* * * * *